US008971276B1

(12) United States Patent
Wix

(10) Patent No.: US 8,971,276 B1
(45) Date of Patent: Mar. 3, 2015

(54) TECHNIQUES FOR INCREASING UPLINK THROUGHPUT FOR MULTIPLE FLOW CONTROL MECHANISMS

(71) Applicant: Marvell International Ltd., Hamilton (BM)

(72) Inventor: Amit Wix, Petah-Tikva (IL)

(73) Assignee: Marvell International Ltd., Hamilton (BM)

( * ) Notice: Subject to any disclaimer, the term of this patent is extended or adjusted under 35 U.S.C. 154(b) by 127 days.

(21) Appl. No.: 13/733,156

(22) Filed: Jan. 3, 2013

Related U.S. Application Data

(60) Provisional application No. 61/584,180, filed on Jan. 6, 2012, provisional application No. 61/680,623, filed on Aug. 7, 2012, provisional application No. 61/715,004, filed on Oct. 17, 2012.

(51) Int. Cl.
*H04W 4/00* (2009.01)
*H04W 72/04* (2009.01)
*H04W 72/12* (2009.01)
*H04W 80/02* (2009.01)

(52) U.S. Cl.
CPC ........ *H04W 72/044* (2013.01); *H04W 72/1278* (2013.01); *H04W 80/02* (2013.01)
USPC ...................................................... 370/329

(58) Field of Classification Search
CPC .................................................. H04W 28/065
USPC ...................................................... 370/329
See application file for complete search history.

(56) References Cited

U.S. PATENT DOCUMENTS 6,785,227 B1 * 8/2004 Lu et al. .................. 370/229
8,274,939 B2 * 9/2012 Park et al. ................ 370/329

OTHER PUBLICATIONS

3GPP TS 25.321, "Technical Specification Group Radio Access Network; Medium Access Control (MAC) protocol specification", Release 11, version 11.0.0, France, 198 pages, Dec. 2011.
3GPP TS 36.321, "Technical Specification Group Radio Access Network; Evolved Universal Terrestrial Radio Access (EUTRA); Medium Access Control (MAC) protocol specification", Release 10, version 10.4.0, France, 54 pages, Dec. 2011.
3GPP TS 25.322, "Technical Specification Group Radio Access Network; Radio Link Control (RLC) protocol specification", Release 10, version 10.1.0, France, 88 pages, Jun. 2011.
3GPP TS 36.322, "Technical Specification Group Radio Access Network; Evolved Universal Terrestrial Radio Access (E-UTRA); Radio Link Control (RLC) protocol specification", Release 10, version 10.0.0, France, 39 pages, Dec. 2010.

(Continued)

*Primary Examiner* — Mark Rinehart
*Assistant Examiner* — Maharishi Khirodhar

(57) ABSTRACT

A method includes, in a mobile communication terminal, accepting from an application layer first data having a first data size for transmission to a base station over a radio channel. An indication of a second data size of second data, which is to be transmitted over the radio channel but was not yet accepted from the application layer, is accepted from the application layer. A resource allocation on the radio channel is calculated in the terminal depending on both the first data size and the second data size. The base station is requested for the resource allocation, and at least part of the first and second data is transmitted from the terminal in accordance with the resource allocation.

12 Claims, 2 Drawing Sheets

(56) References Cited

OTHER PUBLICATIONS

3GPP TS 25.323, "Technical Specification Group Radio Access Network; Packet Data Convergence Protocol (PDCP) specification", Release 10, version 10.1.0, France, 43 pages, Jun. 2011.

3GPP TS 36.323, "Technical Specification Group Radio Access Network; Evolved Universal Terrestrial Radio Access (E-UTRA); Packet Data Convergence Protocol (PDCP) specification", Release 10, version 10.1.0, France, 26 pages, Mar. 2011.

* cited by examiner

TECHNIQUES FOR INCREASING UPLINK THROUGHPUT FOR MULTIPLE FLOW CONTROL MECHANISMS

CROSS-REFERENCE TO RELATED APPLICATIONS

This application claims the benefit of U.S. Provisional Patent Application 61/584,180, filed Jan. 6, 2012, U.S. Provisional Patent Application 61/680,623, filed Aug. 7, 2012, and U.S. Provisional Patent Application 61/715,004, filed Oct. 17, 2012, whose disclosures are incorporated herein by reference.

FIELD OF THE DISCLOSURE

The present invention relates generally to communication systems, and particularly to methods and systems for operating flow control mechanisms.

BACKGROUND

Many communication protocols specify a protocol stack made-up of multiple layers, such as a Physical layer (PHY), a Medium Access Control (MAC) layer and an application layer. In the Universal Terrestrial Radio Access (UTRA) or Universal Mobile Telecommunications System (UMTS) protocol stack, the MAC layer is specified, for example, in "3$^{rd}$ Generation Partnership Project; Technical Specification Group Radio Access Network; Medium Access Control (MAC) protocol specification (Release 11)," TS 25.321, version 11.0.0, December, 2011, which is incorporated herein by reference.

In the protocol stack of Evolved Universal Terrestrial Radio Access (E-UTRA), also referred to as Long-Term Evolution (LTE), the MAC layer is specified, for example, in "3$^{rd}$ Generation Partnership Project; Technical Specification Group Radio Access Network; Evolved Universal Terrestrial Radio Access (E-UTRA); Medium Access Control (MAC) protocol specification (Release 10)," TS 36.321, version 10.4.0, December, 2011, which is incorporated herein by reference.

The E-UTRA protocol further comprises a Radio Link Control (RLC) layer and a Packet Data Convergence Protocol (PDCP) layer above the MAC layer. The RLC layer for UTRA is specified, for example, in "3$^{rd}$ Generation Partnership Project; Technical Specification Group Radio Access Network; Radio Link Control (RLC) protocol specification (Release 10)," TS 25.322, version 10.1.0, June, 2011, which is incorporated herein by reference. The RLC layer for E-UTRA is specified, for example, in "3$^{rd}$ Generation Partnership Project; Technical Specification Group Radio Access Network; Evolved Universal Terrestrial Radio Access (E-UTRA); Radio Link Control (RLC) protocol specification (Release 10)," TS 36.322, version 10.0.0, December, 2010, which is incorporated herein by reference.

The UTRA PDCP layer is specified, for example, in "3$^{rd}$ Generation Partnership Project; Technical Specification Group Radio Access Network; Packet Data Convergence Protocol (PDCP) specification (Release 10)," TS25.323, version 10.1.0, June, 2011, which is incorporated herein by reference. The E-UTRA PDCP layer is specified, for example, in "3$^{rd}$ Generation Partnership Project; Technical Specification Group Radio Access Network; Evolved Universal Terrestrial Radio Access (E-UTRA); Packet Data Convergence Protocol (PDCP) specification (Release 10)," TS 36.323, version 10.1.0, March, 2011, which is incorporated herein by reference.

The description above is presented as a general overview of related art in this field and should not be construed as an admission that any of the information it contains constitutes prior art against the present patent application.

SUMMARY

An embodiment that is described herein provides a method including, in a mobile communication terminal, accepting from an application layer first data having a first data size for transmission to a base station over a radio channel. An indication of a second data size of second data, which is to be transmitted over the radio channel but was not yet accepted from the application layer, is accepted from the application layer. A resource allocation on the radio channel is calculated in the terminal depending on both the first data size and the second data size. The base station is requested for the resource allocation, and at least part of the first and second data is transmitted from the terminal in accordance with the resource allocation.

In some embodiments, accepting the first data includes buffering the first data in a first buffer having a first fill status, accepting the indication includes accepting from the application layer a second fill status of a second buffer that buffers the second data, and calculating the resource allocation includes computing the resource allocation based on both the first fill status and the second fill status.

In an embodiment, calculating the resource allocation includes computing the resource allocation depending on a sum of the first and second data sizes. In another embodiment, accepting the first data includes applying layer-2 processing to the first data, and the first data size includes a size of the first data that has been accepted from the application layer for the layer-2 processing but not yet transmitted on the radio channel.

In yet another embodiment, accepting the indication includes accepting a partitioning of the second data size into two or more Packet Data Protocol (PDP) contexts, and calculating the resource allocation includes mapping the PDP contexts onto multiple logical channels, and calculating the resource allocation separately for each of the logical channels.

In still another embodiment, the second data is partitioned into two or more Packet Data Protocol (PDP) contexts that are mapped onto multiple logical channels, accepting the indication includes receiving a total indication that does not distinguish between the PDP contexts, and calculating the resource allocation includes calculating the entire resource allocation for a logical channel defined as having a highest priority among the logical channels.

There is additionally provided, in accordance with an embodiment that is described herein, apparatus including a transceiver and a processor. The transceiver is configured to communicate with a base station over a radio channel. The processor is configured to accept from an application layer first data having a first data size for transmission to the base station over the radio channel, to accept from the application layer an indication of a second data size of second data, which is to be transmitted over the radio channel but was not yet accepted from the application layer, to calculate a resource allocation on the radio channel depending on both the first data size and the second data size, to request the base station for the resource allocation, and to transmit using the transmitter at least part of the first and second data in accordance with the resource allocation.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and systems for communication between mobile communication terminals and base stations using a protocol stack that defines multiple layers having multiple respective flow control mechanisms.

In UMTS, E-UTRA and other communication protocols, a mobile communication terminal calculates and requests uplink resource allocations from a base station based on the amount of data that is buffered in the terminal's layer-2 (L2) buffer. In addition, the application layer in the terminal typically operates its own flow control mechanism, which regulates data transfer to L2 based on the ability of L2 to receive the data.

In some scenarios, however, operating multiple flow control mechanisms may result in performance degradation or even deadlock. Consider, for example, a scenario in which the base station assigns the terminal a very small resource allocation on the uplink. Because of the small uplink resource allocation, the L2 circuitry in the terminal is slow in transferring data for transmission, and L2 resources are therefore slow to become available for receiving new data from the application layer. As a result, the application layer reduces its data transfer rate to L2. Observing the slow transfer rate from the application layer, the L2 flow control mechanism will request a small uplink resource allocation, and so on. The end result in this scenario is a deadlock in which the terminal continues to transfer data over the uplink at a very low rate, even though the application layer may have a large volume of data to transfer.

In some embodiments that are described herein, the terminal calculates the requested resource allocation based on the size of the data that was already received from the application layer (e.g., based on the fill status of the L2 buffers), as well as the size of the data that is pending in the application layer for transfer (e.g., based on the fill status of the application-layer buffer). This sort of calculation causes the base station to allocate to the terminal uplink resources that match the total size of the pending data, across the multiple protocol layers. Allocating resources in this manner improves uplink performance considerably, and avoids deadlock scenarios such as the scenario described above.

Figure 1:
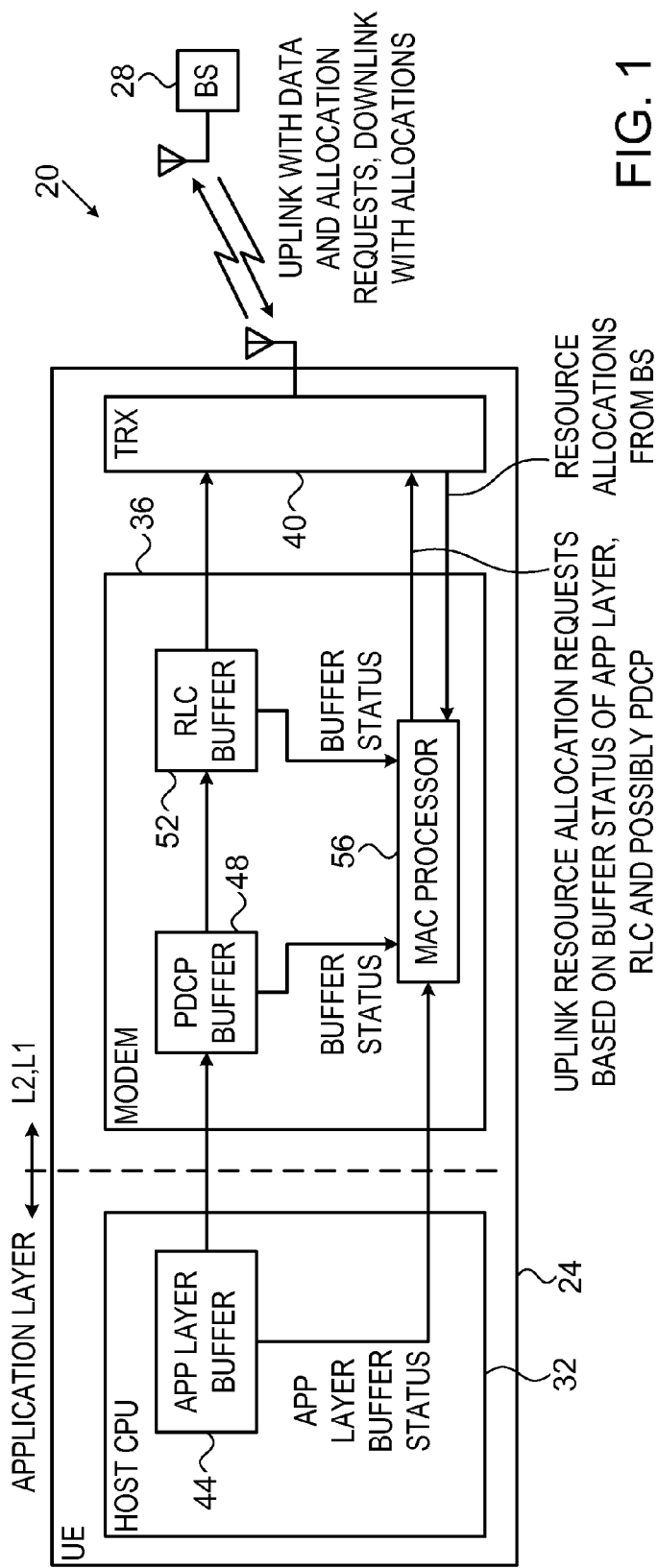
FIG. 1 is a block diagram that schematically illustrates a communication system, in accordance with an embodiment that is described herein.

FIG. 1 is a block diagram that schematically illustrates a communication system 20, in accordance with an embodiment that is described herein. System 20 operates in accordance with a communication protocol such as UMTS or LTE, which defines multiple protocol layers. Generally, the disclosed techniques are applicable to any other suitable communication protocol that allocates bandwidth dynamically based on client buffer status reports.

System 20 comprises a mobile communication terminal 24 that communicates with a Base Station (BS) 28 over a radio channel. Depending on the communication protocol used by system 20, terminal 24 is also referred to as a Mobile Station (MS) or User Equipment (UE), and base station 28 is also referred to as NodeB or eNodeB. UE 24 may comprise, for example, a cellular phone, a wireless-enabled computing device, or any other suitable type of terminal. Although the present example refers to a single base station and a single terminal for the sake of clarity, real-life systems typically comprise a large number of base stations and a large number of terminals.

The protocol stack in question defines multiple layers, in the present example a physical layer (PHY), a Medium Access Control (MAC) layer, a Radio Link Control (RLC) layer, a Packet Data Convergence Protocol (PDCP) layer and an application layer. The MAC, RLC and PDCP layers are collectively referred to as Layer-2 (L2). The PHY is also referred to as Layer-1 (L1). The functions of the various layers are described, for example, in the 3GPP specifications cited above. This protocol configuration and partitioning, however, is chosen by way of example. In alternative embodiments, the disclosed techniques can be applied with protocol stacks having any other suitable layer structure.

In the example of FIG. 1, UE 24 comprises a host Central Processing Unit (CPU) 32, a modem 36 and a transceiver (TRX) 40. In this embodiment, the application layer is implemented on CPU 32, usually as part of one or more user applications, and L2 is implemented in modem 36. Modem 36 typically also carries out some of the L1 (physical layer) functions. TRX 40 transmits uplink data on the uplink radio channel, and receives downlink data on the downlink radio channel, i.e., performs some of the L1 functions of the UE. In alternative embodiments, however, any other suitable partitioning of layers between system elements can be used. In another example embodiment, the application layer is implemented in a host that is external to UE 24. This sort of partitioning is suitable, for example, for cellular modems that are connected to a mobile or personal computer.

In the present example, host CPU 32 comprises an application-layer buffer 44, which buffers data that the application layer intends to transfer to layer-2 for uplink transmission over the radio channel to BS 28. Modem 36 comprises a PDCP buffer 48 and a RLC buffer 52, which buffer uplink data processed by the PDCP and RLC layers, respectively. In the present context, buffers 48 and 52 are sometimes referred to collectively as a layer-2 buffer. In alternative embodiments, modem 36 may comprise any suitable number of L2 buffers, e.g., a single L2 buffer.

In a typical uplink flow, host CPU 32 buffers uplink data produced by the application layer in application-layer buffer 44. The host CPU transfers the data from the application layer to L2, in the present example from application-layer buffer 44 to PDCP buffer 48 in the modem. The data is processed by L2, in the present example by the PDCP, RLC and MAC layers. During the L2 processing the data is transferred to RLC buffer 52 and then onwards to TRX 40 for uplink transmission to BS 28.

A MAC processor 56 manages the operation of modem 36. Among other functions, processor 56 operates two flow control mechanisms related to uplink processing—application-layer flow control toward host CPU 32, and L2 flow control (also referred to as MAC flow control) toward BS 28. The coordinated operation of the two flow control mechanisms is described in greater detail below.

The UE configuration shown in FIG. 1 is an example configuration, which is depicted solely for the sake of clarity. In alternative embodiments, any other suitable UE configuration can also be used. Some UE elements that are not mandatory for understanding of the disclosed techniques have been omitted from the figures for the sake of clarity. The different UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements may be implemented using software executing on programmable hardware, or using a combination of hardware and software elements.

In some embodiments, some elements of UE 24 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

As noted above, MAC processor 56 in UE 24 operates two flow control mechanisms in the uplink processing chain. In the MAC flow control, processor 56 calculates resource allocations on the uplink radio channel based on the volume of pending data, and requests the base station to assign these resource allocations to the UE for transmitting the uplink data. Upon receiving the allocations from the base station, the MAC processor schedules the uplink data for transmission using the allocated uplink resources.

In the application-layer flow control, MAC processor 56 regulates (e.g., accepts or declines) data transfer from the application layer (in the present example from host CPU 32) depending on the ability of the L2 circuitry (in the present example modem 36) to receive and process the data.

In the disclosed embodiments, MAC processor 56 calculates the requested resource allocations on the uplink based on (1) the size of the data that was already received from the application layer, and (2) the size of the data that is pending for transmission in the application layer but not yet received from the application layer.

In the example of FIG. 1, the MAC processor calculates the requested resource allocations on the uplink based on the fill status of application-layer buffer 44 and on the fill status of the L2 buffers (e.g., RLC buffer 52 and possibly PDCP buffer 48).

Typically, host CPU 32 and modem 36 support a suitable interface for reporting the fill status of application-layer buffer 44 from the host CPU to the modem. In one embodiment, the reported fill status of the application-layer buffer is provided to the PDCP layer in the modem. In another embodiment, the reported fill status is provided directly to the RLC layer. In yet another embodiment, the reported fill status is provided directly to the MAC layer.

By requesting uplink channel resources based on the total volume of data that is pending in UE 24, including the various sub-layers of layer-2 and the application layer, the uplink resources are allocated with high accuracy to match the actual throughput needs of the UE. As a result, uplink throughput is increased, and radio channel resources are used efficiently.

Moreover, this technique also avoids allocation deadlocks such as the deadlock scenario described above.

Figure 2:
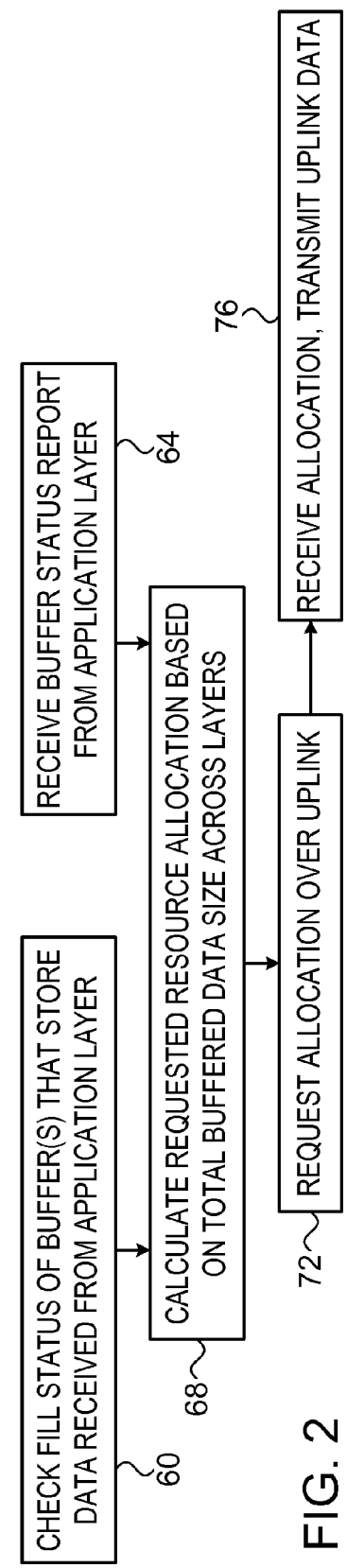
FIG. 2 is a flow chart that schematically illustrates a method for uplink communication using multiple flow control mechanisms, in accordance with an embodiment that is described herein.

FIG. 2 is a flow chart that schematically illustrates a method for uplink communication using multiple flow control mechanisms, in accordance with an embodiment that is described herein. The method begins with MAC processor 56 checking the fill status of the L2 buffers, at a L2 status checking operation 60. In the present example, processor 56 checks the fill status of PDCP buffer 48 and RLC buffer 52. In alternative embodiments, processor 56 checks only the fill status of RLC buffer 52, or alternatively only the fill status of PDCP buffer 48.

Processor 56 receives an indication of the fill status of application-layer buffer 44 from host CPU 32, at an application status checking operation 64. Based on the application-layer fill status and the L2 fill status, processor 56 calculates a requested resource allocation on the uplink, at an allocation calculation operation 68.

In one example embodiment, MAC processor 56 calculates the sum of the two data sizes (the data size of the data buffered in buffer 44 and the data size of the data buffered in buffers 48 and 52), and calculates the requested resource allocation based on the sum. In alternative embodiments, processor 56 may calculate the requested resource allocation, based on the data size of the data buffered in buffer 44 and the data size of the data buffered in buffers 48 and 52, in any other suitable way.

Processor 56 then requests the appropriate uplink resource allocation from BS 28 via transceiver 40, at an allocation requesting operation 72. At a transmission operation 76, MAC processor 56 receives the allocation, and transmits the uplink data using the allocated uplink resources.

In some embodiments, UE 24 requests the uplink resource allocations using uplink signaling commands or mechanisms that are defined in the communication protocol of system 20, e.g., UMTS or LTE. In response to the request, base station 28 notifies the UE of the assigned uplink resource allocations, for example using downlink signaling commands or mechanisms that are defined in the communication protocol in question.

In an example UMTS embodiment, UE 24 requests the uplink resource allocations using the Scheduling Information (SI) reporting mechanism. The uplink resource assignment by the base station is referred to in UMTS terminology as a Scheduling Grant. The SI and Scheduling Grant mechanisms are specified, for example, in the TS 25.321 specification, cited above. In an example LTE or LTE-A embodiment, UE 24 requests the uplink resource allocations using the Buffer Status Reporting (BSR) mechanism. This mechanism is specified, for example, in the TS 36.321 specification, cited above.

Figure 3:
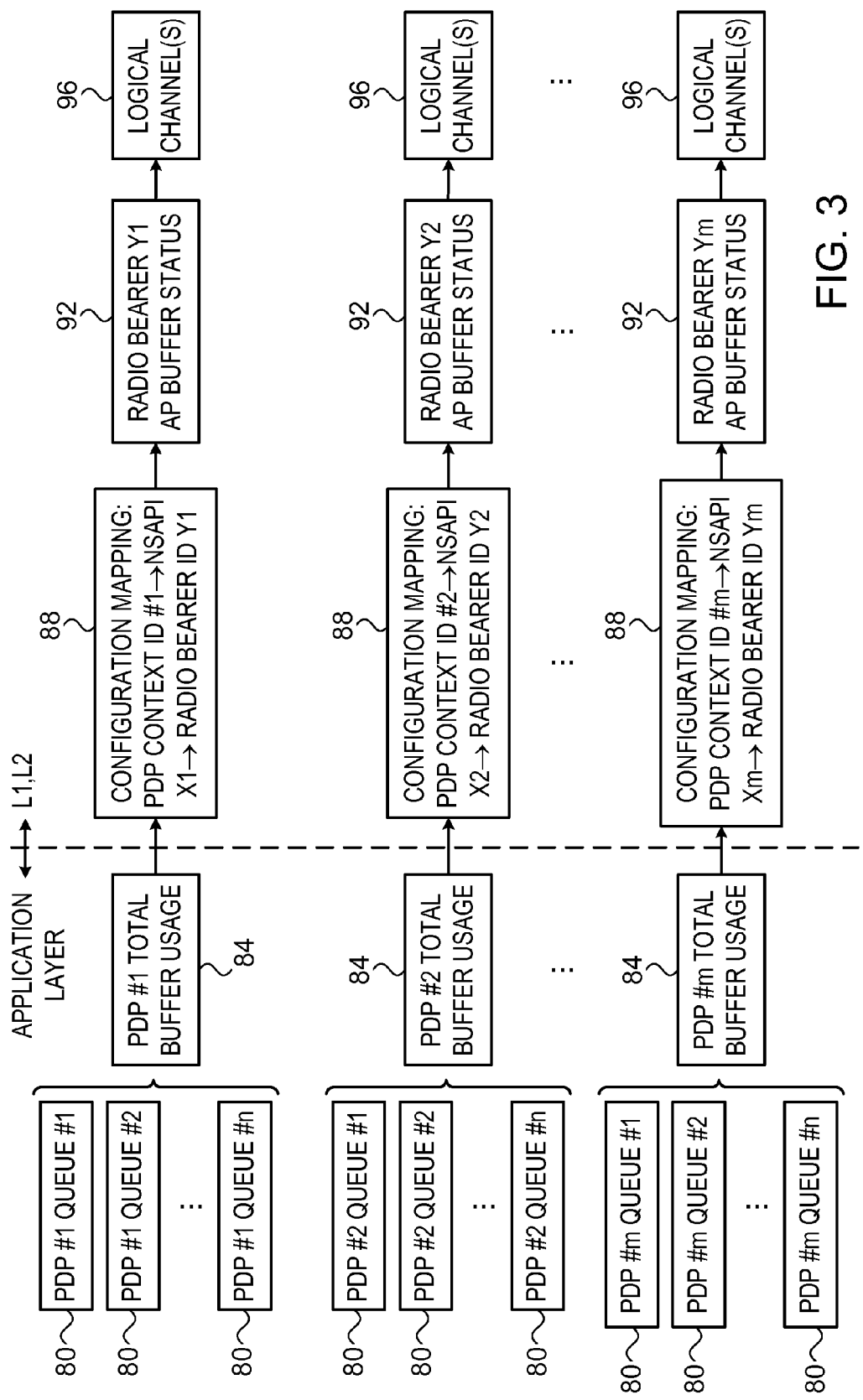
FIG. 3 is a diagram that schematically illustrates a process of calculating uplink resource allocation requests, in accordance with an embodiment of the present invention.

FIG. 3 is a diagram that schematically illustrates a process for calculating uplink resource allocation requests, in accordance with an embodiment of the present invention.

Typically, the data in the application layer is associated with one or more Packet Data Protocol (PDP) contexts. Each PDP context typically indicates a logical association between a UE and a Public Data Network (PDN). The context defines aspects such as routing, Quality of Service (QoS), security, billing, among others. In most cases, each PDP context corresponds to a respective user service that runs in the application layer and that requires the above-listed parameters that the PDP context defines. For example, different PDP contexts may be used to serve a handheld Internet connection, an MMS service, a dial-up traffic connection when the UE uses a dial-up modem, a Push-To-Talk (PTT) over Cellular service, and so on.

In some embodiments, the application layer is able to distinguish between pending uplink data of different PDP contexts, and report the size of the pending data separately for each PDP context. The process of FIG. 3 refers to such embodiments. A solution for embodiments in which the application layer does not report the pending data size per PDP context is addressed further below.

In the example of FIG. 3, a total of m PDP contexts are active. Application-layer buffer 44 comprises multiple queues 80, which are assigned uniquely to the PDP contexts. In other words, each PDP context is assigned one or more queues 80 for buffering its pending uplink data. Separate queuing per PDP context is just one example of an application layer that is able to distinguish between the pending data of different PDP contexts and thus report the pending data size per PDP context.

In this example, host CPU 32 sends a list of m buffer fill status values 84 to modem 36. The $i^{th}$ buffer fill status value (i=1 ... m) indicates the size of the data in buffer 44 belonging to the $i^{th}$ PDP context.

In accordance with the UMTS specification, each PDP context is assigned a respective identifier referred to as Network Service Access Point Identifier (NSAPI). Each NSAPI is then mapped via one-to-one mapping onto a respective Radio Access Bearer (RAB) that is identified by a Radio Access Bearer Identifier (RAB-ID). Each RAB-ID is in turn mapped to a respective RLC Radio Bearer (RB) that is identified by a Radio Bearer Identifier (RB-ID). Each RLC Radio Bearer is mapped to either one or two (usually one) logical channels. Each Logical channel is identified by a respective Logical Channel Identity (LOGCH-ID). Typically, the uplink resource allocation of the base station is assigned dynamically per logical channel or per group of logical channels. The above mappings are typically set semi-statically, e.g., during connection setup and/or during connection reconfiguration.

In some embodiments, MAC processor 56 is provided with current mappings 88 of PDP contexts to radio bearers (possibly although not necessarily via the NSAPIs). Using this mapping, processor 56 translates the buffer fill status values 84 (per PDP context) into uplink resource allocation requests 92 (per radio bearer). UE 24 then requests the uplink resource allocations from BS 28 per (one or two) logical channels 96, as specified in the UMTS specification.

The technique of FIG. 3 enables UE 24 to comply with the UMTS specifications in terms of SI reporting per radio bearer, while reflecting the actual requirements of the application layer per PDP context. When using this technique, the uplink resource allocations of BS 28 are better matched to the actual requirements of the UE, across layers, and are more likely to be utilized efficiently.

In alternative embodiments, the data in the application layer is partitioned among multiple PDP contexts, but the report from the application layer to modem 36 gives the total pending data size without distinguishing between pending data of different PDP contexts. In an example embodiment of this sort, the pending data of all PDP contexts is queued in a single queue, or otherwise intermixed in a way that prevents the application layer from distinguishing between pending data of different PDP contexts.

In some embodiments, when modem 36 is provided only with aggregate information over all PDP contexts, MAC processor 56 attributes the entire uplink resource allocation reported by the application layer to the logical channel that has the highest priority among the logical channels. This uplink resource allocation request is calculated based on the total data size pending in the application layer, i.e., over all PDP contexts.

In an example embodiment, processor 56 uses the above reporting scheme in a way that is consistent with the SI reporting mechanism defined in the UMTS specification. SI reporting comprises the following fields:
  A Total Enhanced Dedicated Channel (E-DCH) Buffer Status (TEBS) field, indicating the total amount of data available across all logical channels for which reporting has been requested by the Radio Resource Control (RRC).
  A Highest priority Logical channel Identity (HLID) field, indicating the highest-priority logical channel having available data.
  A Highest priority Logical channel Buffer Status (HLBS) field, indicating the amount of data available from the logical channel identified by HLID, relative to the highest value of the buffer size range reported by TEBS.

Typically, triggering of SI reporting is performed based on SI timers and on TEBS. For example, SI reporting can be triggered whenever TEBS becomes greater than zero.

In an example embodiment, MAC processor 56 triggers SI reporting as early as possible, and, when triggered, includes the total size of the data in application-layer buffer 44 in the reported TEBS value. Using this technique, HLID and HLBS should be calculated in a way that maintains consistency of the SI reporting.

In an example embodiment, processor 56 calculates the various SI reporting fields as follows:
  TEBS calculation:
    Reported TEBS=Total L2 Buffer Status+Application-layer Buffer Status.
  HLID calculation:
    If[Total L2 Buffer Status==0]
      Reported HLID=Highest priority logical channel configured to be reported in SI. Else
      Reported HLID=Highest priority logical channel having pending data in L2.
  HLBS calculation:
    Reported HLBS=(L2 buffer status for the highest logical channel with L2 data+application-layer Buffer status)/the highest value of the buffer size range of the "Reported TEBS" calculated above.

Although the embodiments described herein mainly address UMTS, the methods and systems described herein can also be used in other applications, such as in other communication protocols in which the layer that reports buffer status from different logical tunnels cannot differentiate between them, and in which the buffer status reporting mechanism dedicates special fields for a certain logical tunnel, which may be identified as the tunnel with some special characteristics. (In this example the characteristic is logical channel priority).

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a mobile communication terminal, accepting from an application layer first data having a first data size for transmission to a base station over a radio channel;

accepting from the application layer an indication of a fill status of a buffer that is indicative of a second data size of second data, which is to be transmitted over the radio channel but is buffered in the buffer and was not yet accepted from the application layer;

calculating in the terminal a resource allocation on the radio channel, depending on both the first data size and the fill status of the buffer; and requesting the base station for the resource allocation, and transmitting at least part of the first and second data from the terminal in accordance with the resource allocation.

2. The method according to claim 1, wherein calculating the resource allocation comprises computing the resource allocation depending on a sum of the first and second data sizes.

3. The method according to claim 1, wherein accepting the first data comprises applying layer-2 processing to the first data, and wherein the first data size comprises a size of the first data that has been accepted from the application layer for the layer-2 processing but not yet transmitted on the radio channel.

4. The method according to claim 1, wherein accepting the indication comprises accepting a partitioning of the second data size into two or more Packet Data Protocol (PDP) contexts, and wherein calculating the resource allocation comprises mapping the PDP contexts onto multiple logical channels, and calculating the resource allocation separately for each of the logical channels.

5. The method according to claim 1, wherein the second data is partitioned into two or more Packet Data Protocol (PDP) contexts that are mapped onto multiple logical channels, wherein accepting the indication comprises receiving a total indication that does not distinguish between the PDP contexts, and wherein calculating the resource allocation comprises calculating the entire resource allocation for a logical channel defined as having a highest priority among the logical channels.

6. Apparatus, comprising:

a transceiver, which is configured to communicate with a base station over a radio channel; and a processor, which is configured to accept from an application layer first data having a first data size for transmission to the base station over the radio channel, to accept from the application layer an indication of a fill status of a buffer that is indicative of a second data size of second data, which is to be transmitted over the radio channel but is buffered in the buffer and was not yet accepted from the application layer, to calculate a resource allocation on the radio channel depending on both the first data size and the fill status of the buffer, to request the base station for the resource allocation, and to transmit using the transmitter at least part of the first and second data in accordance with the resource allocation.

7. The apparatus according to claim 6, wherein the processor is configured to calculate the resource allocation depending on a sum of the first and second data sizes.

8. The apparatus according to claim 6, wherein the processor is configured to apply layer-2 processing to the first data, and wherein the first data size comprises a size of the first data that has been accepted from the application layer for the layer-2 processing but not yet transmitted on the radio channel.

9. The apparatus according to claim 6, wherein the processor is configured to accept from the application layer a partitioning of the second data size into two or more Packet Data Protocol (PDP) contexts, to map the PDP contexts onto multiple logical channels, and to calculate the resource allocation separately for each of the logical channels.

10. The apparatus according to claim 6, wherein the second data is partitioned into two or more Packet Data Protocol (PDP) contexts that are mapped onto multiple logical channels, and wherein the processor is configured to receive from the application layer a total indication that does not distinguish between the PDP contexts, and to calculate the entire resource allocation for a logical channel defined as having a highest priority among the logical channels.

11. A mobile communication terminal comprising the apparatus of claim 6.

12. A chipset for processing signals in a mobile communication terminal, comprising the apparatus of claim 6.

* * * * *